April 9, 1957  E. L. BAIRD  2,788,238
SEMI-COLLAPSIBLE CAMPING SHELTER
Filed June 2, 1953  2 Sheets-Sheet 1
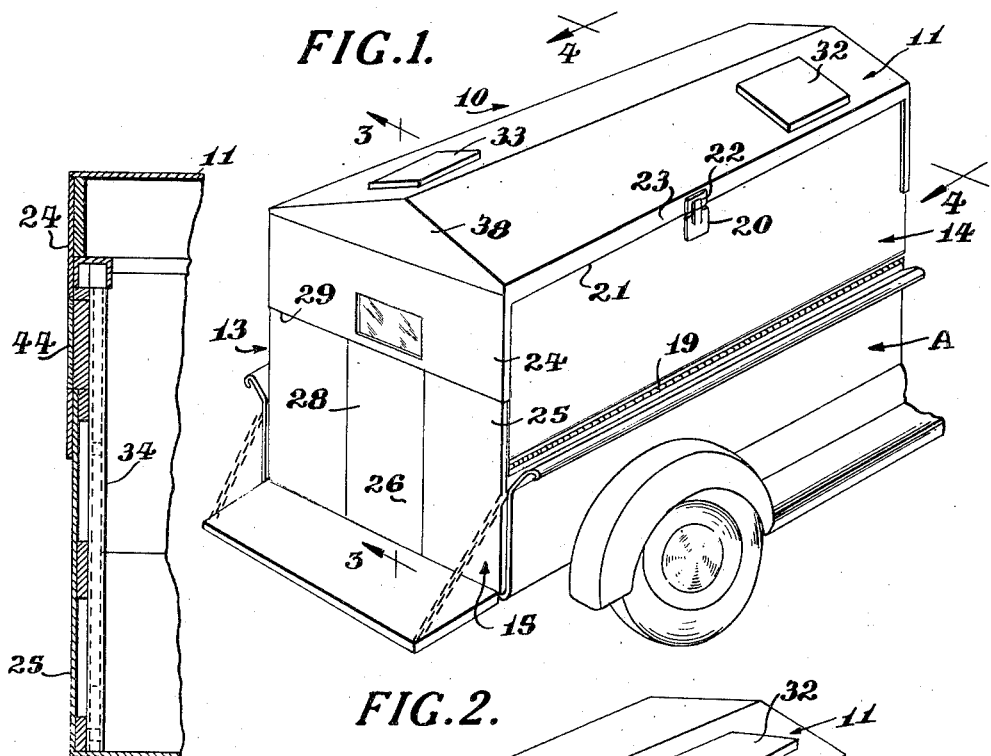
FIG. 1.
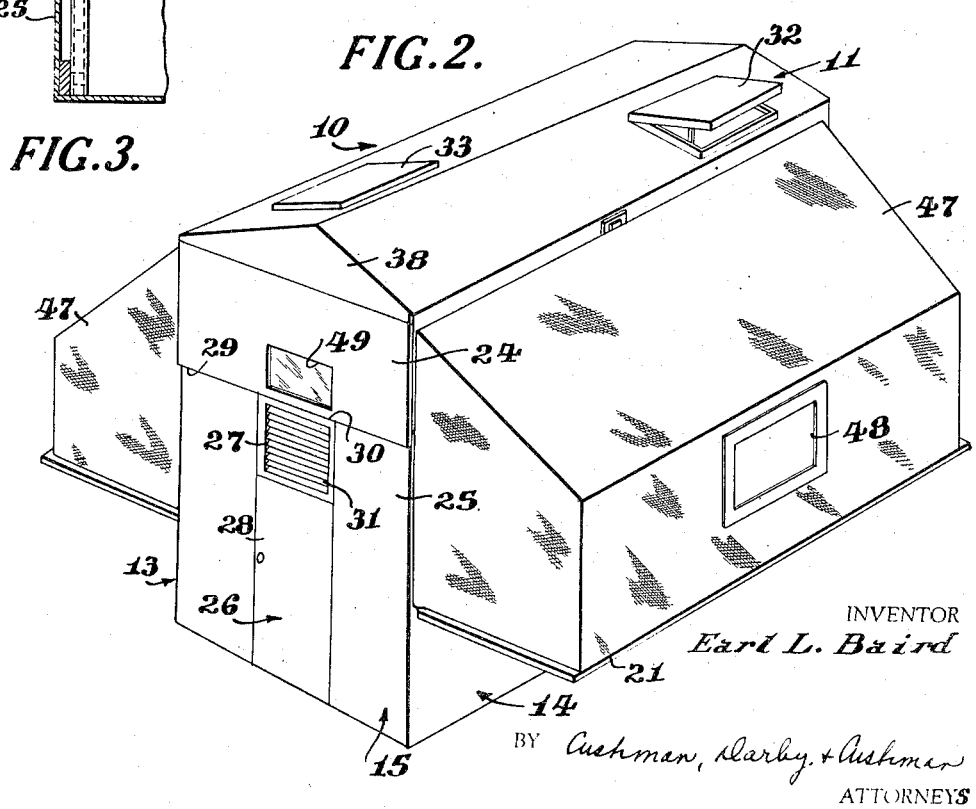
FIG. 2.
FIG. 3.
INVENTOR
Earl L. Baird
BY Cushman, Darby & Cushman
ATTORNEYS April 9, 1957  E. L. BAIRD  2,788,238
SEMI-COLLAPSIBLE CAMPING SHELTER
Filed June 2, 1953  2 Sheets-Sheet 2
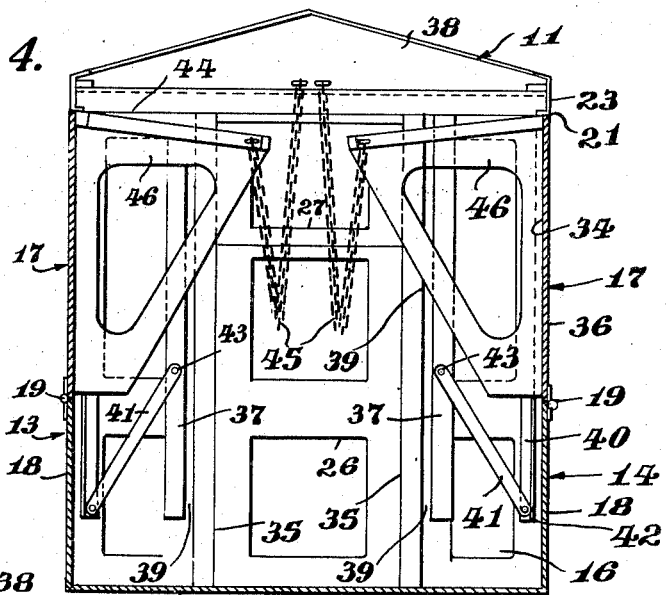
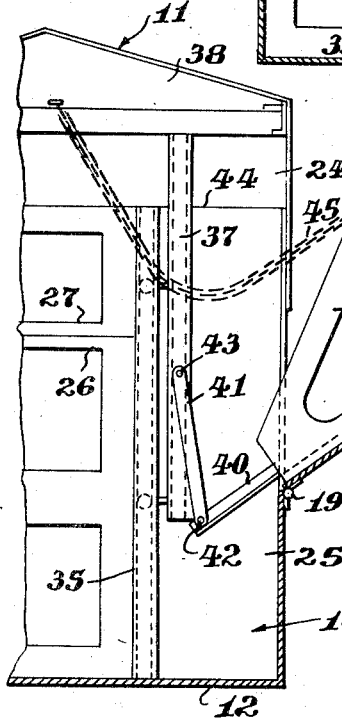
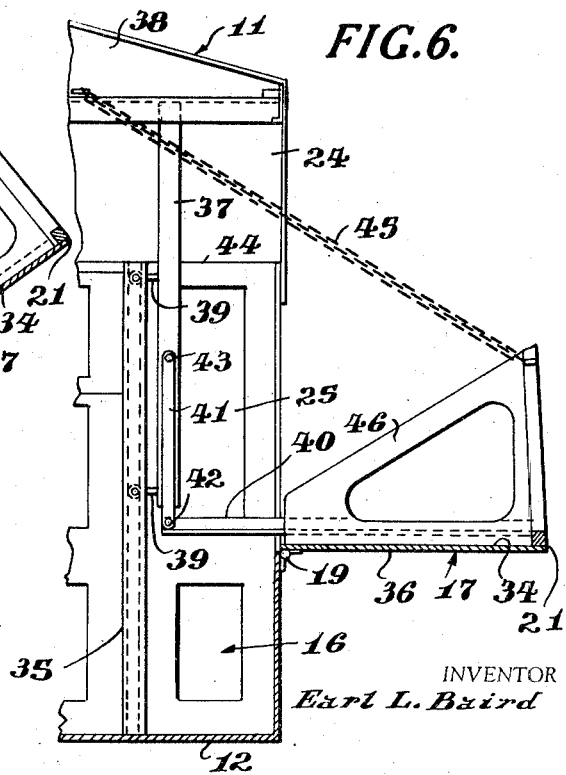
INVENTOR
Earl L. Baird
BY Cushman, Darby & Cushman
ATTORNEYS United States Patent Office 2,788,238
Patented Apr. 9, 1957

2,788,238
SEMI-COLLAPSIBLE CAMPING SHELTER

Earl L. Baird, Casper, Wyo.

Application June 2, 1953, Serial No. 359,171

1 Claim. (Cl. 296—23)

This invention relates to camp sleeping shelters, and it relates in particular to improvements in shelters of the type which may be carried in the body of a pickup truck, or in the body of a light trailer.

For hunting and fishing in mountainous sections of the country, and other sections where the terrain is rugged and difficult to travel, many sportsmen use a vehicle particularly adapted for traveling in such country. The requirements of such a vehicle are a high road clearance and extra power usually through the use of truck transmissions.

Small pickup trucks are particularly adaptable for use in such terrain and accordingly many are equipped with some sort of camping unit. However, for the most part, those camping units which are high enough to provide reasonable head room are usually too top heavy for use on many of the narrow roads encountered in rough and mountainous country. On the other hand, those units wide enough to allow for adequate sleeping space inside are usually too wide for passage through narrow canyons and the like. Furthermore, most of these units offer too much resistance to strong winds when traveling to and from camp locations and are for the most part too heavy to be practical.

It is an object of this invention to provide an improved camping unit which is compact when closed and exceptionally spacious when open.

It is another object of this invention to provide an improved camping unit which, when closed, will substantially fit within the overall dimensions of the common pickup truck now in use.

It is still another object of this invention to provide an improved camping unit of exceptionally light construction which can be used on the body of a truck or utility trailer or may be easily removed from the truck or trailer and placed on the ground at any selected spot, whereby other use may then be made of the pickup truck.

It is a further object of this invention to provide a camping unit which is large enough even when closed to allow space for all gear and supplies needed on an extended camping trip.

It is a still further object of this invention to provide a camping unit which is quickly secured and made weather tight.

It is an important object of this invention to provide a camping unit which will collapse from a height providing full head room when open into a low compact weather tight unit when closed.

It is an additional object of this invention to provide a camping unit which is weather proof when closed and yet may be accessible to the interior without opening the unit for use.

It is another important object of this invention to provide a camping shelter unit which is easily opened and closed by a sole camper.

Other objects and advantages will be apparent during the course of the following description.

In the accompanying drawings, forming a part of this application, and in which like numerals are employed to designate like parts throughout the same:

Figure 1 is a perspective view of a preferred embodiment of the camping shelter unit showing it in a closed position as it may be carried in the body of a pickup truck or trailer.

Figure 2 is a perspective view of this preferred embodiment of the invention similar to that of Figure 1 but showing the camp shelter unit in the opened position, and removed from the truck.

Figure 3 is a fragmentary vertical section of the shelter taken on the line 3—3 of Figure 1.

Figure 4 is a vertical section taken on the line 4—4 of Figure 1 showing the frame structure when in a folded position.

Figure 5 is a fragmentary section similar to that of Figure 4, but showing a bed supporting portion in a partially open position, and Figure 6 is a fragmentary section similar to that of Figure 5 showing a bed supporting portion in the full open horizontal position.

In the drawings, wherein for the purpose of illustration is shown a preferred embodiment of this invention, the numeral 10 (Figure 1) designates this camp shelter unit which is illustrated as it would appear in a trailer or pickup truck body A. It will be noted from Figure 1 that the unit when closed has the appearance of a small box car, and that all canvas and movable parts are completely enclosed within this structure.

Generally, the camp shelter unit comprises a box-like structure having a roof or top 11, bottom 12, walls 13 and 14 and walls 15 and 16 which are all substantially rectangular in shape. Top 11 may be pitched as shown in the figures to assist in drainage when the weather is inclement. The components of the opposite walls 13 and 14 being identical, they are accordingly designated by like numerals. Each of these sides 13 and 14 (Figure 4) is comprised of upper and lower sections 17 and 18 respectively, extending the length of the unit and fastened together by hinges 19 so as to permit the upper sections 17 to pivot outwardly from the vertical position when closed (Figure 4) into a horizontal open position (Figures 5 and 6). Locking means 20 (Figure 1) are secured to the top edge 21 of the upper section 17 for engagement with a mating part 22 attached to the edge 23 of the roof intermediate the ends 15 and 16.

The ends 15 and 16 of this unit are likewise comprised of upper and lower sections 24 and 25, respectively, the upper portions 24 telescoping over the lower portions 25 so as to encase a part of the lower portions therebetween. In the center of the lower end portion 25 of end 15 is a two-piece door 26 (Figure 2) which is comprised of an upper door 27 and a lower door 28, both hinged to swing outwardly. In the closed position the upper end portion 24 telescopes and encloses the top piece 27 of this two-piece door 26, and in the open position the lower edge 29 of the top end portion 24 is adjacent to the top edge 30 of the upper door 27. Louvers 31 are provided in the upper door 27 in order to furnish ventilation in the unit. When the unit is in the closed position the top end portion 24 completely covers these louvers 31 so as to make the ends 15 and 16 of the unit weatherproof. To further increase ventilation in the unit when open, roof ventilators 32 and 33 (Figures 1 and 2) may be placed on either one or both slopes of the pitched roof.

To open this unit, the locking means 20 and 22 on each side of the unit are released from engagement with each other and the top portions 17 of the sides 14 are allowed to pivot outwardly. While this is being done, the roof 11 is automatically elevated to full head room, as will be described hereinafter.

Reference is now made to Figure 4. Parallel tracks 35 are vertically secured to the inside faces of ends 15 and 16 and are spaced apart so as to straddle the doors 26 centrally disposed in these ends. Supporting posts or stanchions 37 depend from each end plate 38 of the roof 11, parallel to tracks 35 and adjacent thereto. Each stanchion is secured to its adjacent track member by means of roller fasteners 39 which are integrally secured to the stanchions and are slidably mounted on the tracks.

Lifting arms or levers 40 made of steel of a structural shape sufficient to give them rigidity and strength are secured to the inside faces 34 of upper side portions 17 so as to extend from edges 21 transversely across these upper portions and project beyond hinges 19. Links or pitmans 41, also fabricated from steel or some other material so as to have good characteristics of strength and rigidity, are pivotally secured to the projecting ends 42 of the lifting arms 40. These links 41 are inclined upwardly and inwardly toward the center of the sleeping shelter for pivotal attachment to the closest depending stanchion 37 at 43. Accordingly, when the latch 20 on the outside face 36 of the upper portion 17 of the side 14 is released and this upper portion is pivoted downwardly, the lifting arm 40 pivots about the hinge 19 thereby forcing the link 41 upwardly, whereby the lower end of the rocker arm moves arcuately toward the vertical plane passing through its upper end. At the same time this upward movement of the link 41 lifts the stanchion 37 vertically upward also, which results in elevating the roof 11 from its position of rest on the top edge 44 of the ends 15 and 16.

Limiting means such as a chain 45 secured between triangular frames 46 and end plates 38 of the roof 11 arrests the pivotal movement of the upper portions 17 when they have revolved into a horizontal plane. Inasmuch as upper portions 17 are heavier than the roof 11, a state of equilibrium is reached at this point since the tendency to rotate further transmits a downward pressure on the roof 11 through the limiting chain 45 which is equally and oppositely off-set by the upward pressure caused by this same pivotal force transmitted through the linkage comprising the lifting arms 40, the link 41, and the stanchions 37. This linkage is so designed and arranged that the maximum head room is obtained when the upper portions 17 have been pivoted into the horizontal position.

These upper portions 17, of course, provide the necessary base for bedding and in this preferred embodiment are approximately 20" above the level of the floor. By rotating these bed supporting upper portions outwardly, approximately 4 feet of free floor space is obtained. The length of this preferred embodiment is approximately 7⅓ feet, and is the same whether opened or closed, whereas the width of the shelter in the closed position is substantially 4 feet while in the open position is approximately 9⅓ feet. When the unit is closed it is 4¾ feet high and 6¼ feet high when open.

Referring to Figure 5, a triangular frame 46 is secured to the inside face 34 of the bed supporting portion 17 of the sides and is upstanding therefrom to provide a supporting structure for a canopy 47 (Figure 2) which extends downwardly from the roof and covers this frame so as to completely enclose the bed supporting portions 17 of the sides. Provision is made for windows 48 in each upstanding side portion of these canopies 47 as well as windows 49 in the outside telescoping portions of the ends depending from the roof. In addition to supporting the canvas canopy 47 about the bed supporting portions 17, these triangular frames 46 also serve to fold the canvas neatly inside the shelter when the bed supporting portions 17 are folded upwardly into the closed position. All four windows are hidden and all canvas and working parts are enclosed when the unit is closed thereby making the unit weatherproof and tamper-proof.

When the unit is in the closed position, entry may still be made through the lower door 28 so as to enable one to put in last minute supplies such as groceries, camping equipment, etc., without opening the entire shelter.

In order to set up camp, the camper may pull down either side whereupon the other side automatically follows, and the roof automatically raises. He then has merely to open the doors, loosen the straps holding the beds in place and the camp is set up. A dome light (not shown) furnishes light to the shelter and is secured to the underportion of the roof. Electricity for this light may be supplied from the battery of the car. All of the framework is of skeleton construction with the exception of the bed supporting portion so as to provide a light structure which may be easily handled by one or two men in removing the shelter from the body of the truck or trailer. Light sheathing is placed over this framework so as to completely enclose the unit.

Thus it may be seen that herein disclosed is a lightweight, compact camping shelter unit which may be easily carried in the body of a truck or trailer without being top-heavy or presenting hazardous resistance to winds encountered while the vehicle is in motion, and yet when open is exceedingly spacious and readily adaptable for use with a minimum of effort. Noteworthy is the fact that no cranking, winching or similar activity is required in order to open this unit nor are any cables or pulleys used in this device. When one bed portion is let down, the other side automatically follows as aforesaid, and this is accomplished so effortlessly that any teen-age child can set up camp with this invention.

It is to be understood that the form of this invention, herewith shown and described, is to be taken as a preferred embodiment of the same, in that various changes in the shape, size and arrangement of the parts may be resorted to, without departing from the spirit of this invention or scope of the subjoined claims.

I claim:

A camping shelter unit comprising opposed fixed upright end walls, one of said end walls including a door substantially coexistensive vertically with said one end wall and hinged thereto about a vertical axis, said door comprising upper and lower sections independently movable, fixed lower side walls connecting said end walls in spaced relation, upper side walls hingedly connected to said lower side walls for outwardly swinging movement between a closed vertical position and an open horizontal position, vertical guide members carried by said end walls, a roof having fixed depending posts connected with said guide members for vertical sliding movement and fixed depending end walls telescopically arranged with respect to said first mentioned end walls, the depending end wall adjacent said door including a portion having a height approximately equal to the height of said upper door section so as to substantially cover the same when in its lower telescoped position, and means interconnecting said upper side walls with said roof whereby movement of said upper side walls into their open horizontal position will raise said roof and telescope the roof end walls upwardly with respect to said first mentioned end walls.

References Cited in the file of this patent

UNITED STATES PATENTS

| 1,318,994 | Hancock | Oct. 14, 1919 |
| 1,861,548 | Peck | June 7, 1932 |
| 1,864,047 | Lawhorne | June 21, 1932 |
| 2,155,582 | Bond | Apr. 25, 1939 |
| 2,173,076 | Stetson | Sept. 12, 1939 |
| 2,292,107 | Doepke | Aug. 7, 1942 |

FOREIGN PATENTS

| 252,590 | Great Britain | June 3, 1926 |